United States Patent
Kim

(10) Patent No.: US 8,049,981 B2
(45) Date of Patent: Nov. 1, 2011

(54) METHOD OF CONTROLLING A FILTER COEFFICIENT OF A CONTINUOUS TIME FILTER AND DATA STORAGE DEVICE THEREOF

(75) Inventor: Jung Keun Kim, Yongin-si (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 0 days.

(21) Appl. No.: 12/753,969

(22) Filed: Apr. 5, 2010

(65) Prior Publication Data

US 2010/0254038 A1    Oct. 7, 2010

(30) Foreign Application Priority Data

Apr. 6, 2009    (KR) .................. 10-2009-0029312

(51) Int. Cl.
*G11B 27/36* (2006.01)
(52) U.S. Cl. ........................................................ 360/31
(58) Field of Classification Search ............... 360/31, 360/75, 25, 65, 51; 324/210; 714/799; 708/801
See application file for complete search history.

(56) References Cited

U.S. PATENT DOCUMENTS

| | | | | |
|---|---|---|---|---|
| 5,831,888 A | * | 11/1998 | Glover | 708/801 |
| 5,862,157 A | * | 1/1999 | Bessios | 714/799 |
| 5,995,305 A | | 11/1999 | McNeil et al. | |
| 6,108,153 A | * | 8/2000 | Glover | 360/51 |
| 6,108,554 A | * | 8/2000 | Kawamoto | 455/456.5 |
| 6,414,806 B1 | * | 7/2002 | Gowda et al. | 360/25 |
| 6,862,152 B2 | * | 3/2005 | Wu et al. | 360/65 |
| 7,097,110 B2 | * | 8/2006 | Sheperek et al. | 236/1 C |
| 7,561,358 B2 | * | 7/2009 | Wang | 360/31 |
| 2006/0222897 A1 | * | 10/2006 | Kamata et al. | 428/826 |
| 2009/0256557 A1 | * | 10/2009 | Kiyono et al. | 324/210 |

FOREIGN PATENT DOCUMENTS

| | | |
|---|---|---|
| JP | 2001-338476 | 12/2001 |
| JP | 2002-298506 | 10/2002 |
| KR | 10-594328 | 6/2006 |

* cited by examiner

*Primary Examiner* — Fred Tzeng
(74) *Attorney, Agent, or Firm* — Stanzione & Kim, LLP

(57) ABSTRACT

A method of controlling a filter coefficient of a continuous time filter of a data storage device is provided. The method of controlling filter coefficient includes positioning a magnetic head at a first reference height from surface of a magnetic disk and outputting a plurality of CSM values by measuring a channel state from a read signal output from the magnetic head when changing a cut-off frequency of the continuous time filter, positioning the magnetic head at a second reference height spaced from the first reference height and measuring a bit error ratio from a read signal output from the magnetic head positioned at the second reference height according to at least one CSM value selected among a plurality of CSM values, and controlling a filter coefficient value to determine a cut-off frequency of the continuous time filter according to a measured bit error ratio.

12 Claims, 6 Drawing Sheets

FIG. 3A

| FC | 60 | 70 | 80 | 90 | A0 | B0 | C0 |
|---|---|---|---|---|---|---|---|
| CSM | 1422 | 1339 | 1332 | 1341 | 1265 | 1434 | 1639 |
| BER | -4.51 | -4.54 | -4.61 | -4.59 | -4.54 | -4.53 | |

FIG. 4A

| FB | A0 | 98 | 90 | 88 | A8 | B0 | B8 |
|---|---|---|---|---|---|---|---|
| CSM | 2744 | 2559 | 2641 | 2573 | 2886 | 3045 | 3572 |
| BER | -6.78 | -6.89 | -7.03 | -6.93 | -6.91 | -6.77 | |

METHOD OF CONTROLLING A FILTER COEFFICIENT OF A CONTINUOUS TIME FILTER AND DATA STORAGE DEVICE THEREOF

CROSS-REFERENCE TO RELATED APPLICATIONS

This application claims priority under 35 U.S.C. §119 to Korean Patent Application No. 10-2009-0029312, filed on Apr. 6, 2009, in the Korean Intellectual Property Office, the disclosure of which is incorporated herein in its entirety by reference.

BACKGROUND

1. Field of the Invention

Embodiments of the present general inventive concept relate to a method of controlling a filter coefficient of a continuous time filter of a data storage device, and more particularly, to a method of controlling a filter coefficient of a continuous time filter of a data storage device, which may draw (and/or calculate) an optimal filter coefficient value considering a flying height change of a magnetic head, and a data storage device to perform the method.

2. Description of the Related Art

Generally, a hard disk drive (HDD), a kind of a data storage device, replays data recorded on a disk by the magnetic head or contributes to a computer system operation by recording user data on the disk.

As the HDD gradually becomes high capacity, high density and miniaturized, Bit per inch (BPI), which is density of a disk turning direction, and Track per inch (TPI), which is density of a radial direction, are on an increasing trend and more delicate mechanisms are required, accordingly. The HDD affects read and write performance of data depending on a flying height of the magnetic head, which is distance between the magnetic head and the disk. The flying height of the magnetic head is changed temporarily or permanently by a use environment of the HDD, e.g., a long time use, changes of a use environment or physical impacts and so on.

The flying height change of the magnetic head affects read or write performance of data. For example, as the flying height of the magnetic head gets lower, the read and write performance is improved but crash-occurring possibility between the magnetic head and a disk is increased by disturbance according to the impacts, and so on. As the flying height of the magnetic head gets higher, the crash occurring possibility may be reduced but the read and write performance is deteriorated.

Conventionally, a target flying height of the magnetic head is determined according to a flying on demand (FOD) value calculated at a beginning of a process, and a test determining filter coefficient of a continuous time filter (CTF) is processed, accordingly. However, an above-mentioned test method may cause an error of a HDD since it doesn't consider a flying height change of the magnetic head according to a use environment of a HDD.

SUMMARY

The present general inventive concept provides a method of controlling a filter coefficient of a continuous time filter to draw an optimal filter coefficient value. It can also provide a data storage device including such a continuous time filter.

Additional features and utilities of the present general inventive concept will be set forth in part in the description which follows and, in part, will be obvious from the description, or may be learned by practice of the general inventive concept.

Example embodiments of the present general inventive concept provide a method of controlling a filter coefficient of a continuous time filter, including positioning a magnetic head at a first reference height away from surface of a magnetic disk and outputting a plurality of CSM values by measuring a channel state from a read signal output from the magnetic head when changing a cut-off frequency of the continuous time filter, positioning the magnetic head at a second reference height spaced from the first reference height and measuring a bit error ratio from a read signal output from the magnetic head positioned at the second reference height according to at least one CSM value among the plurality of CSM values and controlling a filter coefficient value for determining a cut-off frequency of the continuous time filter according to a measured bit error ratio.

Example embodiments of the present general inventive concept provide a data storage device, including a magnetic disk to store data, a magnetic head separated by a flying height from surface of the magnetic disk and to output a read signal by decoding data of the magnetic disk, a continuous time filter to filter and output a read signal at every variable cut-off frequency, a measurement unit to measure a channel state and a bit error ratio from a filtered read signal and to output a measurement result, and a micro-processor unit to control a filter coefficient value of the continuous time filter according to a measurement result output from the measurement unit when varying a cutoff frequency of the continuous time filter.

Example embodiments of the present general inventive concept also provide a method of controlling a filter coefficient of a continuous time filter of a data storage device, including varying a cutoff frequency with the continuous time filter and outputting at least one read signal by decoding data from the data storage device, measuring a channel state and a bit error of at least one filtered read signal according to the varied cutoff frequency and outputting a measurement result with a measurement apparatus, and controlling a filter coefficient value of the continuous time filter according to the measurement result with a controller.

Example embodiments of the present general inventive concept also provide a data storage apparatus, including a data storage unit to store data, a continuous time filter to vary a cutoff frequency and to output at least one read signal by decoding data from the data storage unit, a measurement apparatus to measure a channel state and a bit error of at least one filtered read signal according to the varied cutoff frequency and to output a measurement result, and a controller to control a filter coefficient value of the continuous time filter according to the measurement result.

Example embodiments of the present general inventive concept also provide a method of controlling a hard disk drive, including controlling a flying height of a magnetic head of the hard disk drive, and determining a filter coefficient value of a continuous time filter of the hard disk drive by measuring a reading operation performance of the magnetic head and controlling the continuous time filter operation state.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIGS. 3A to 4B are example embodiments of the present general inventive concept according to a filter coefficient controlling operation of a continuous time filter of the data storage device of FIG. 2.

DETAILED DESCRIPTION OF THE EMBODIMENTS

Figure 1:
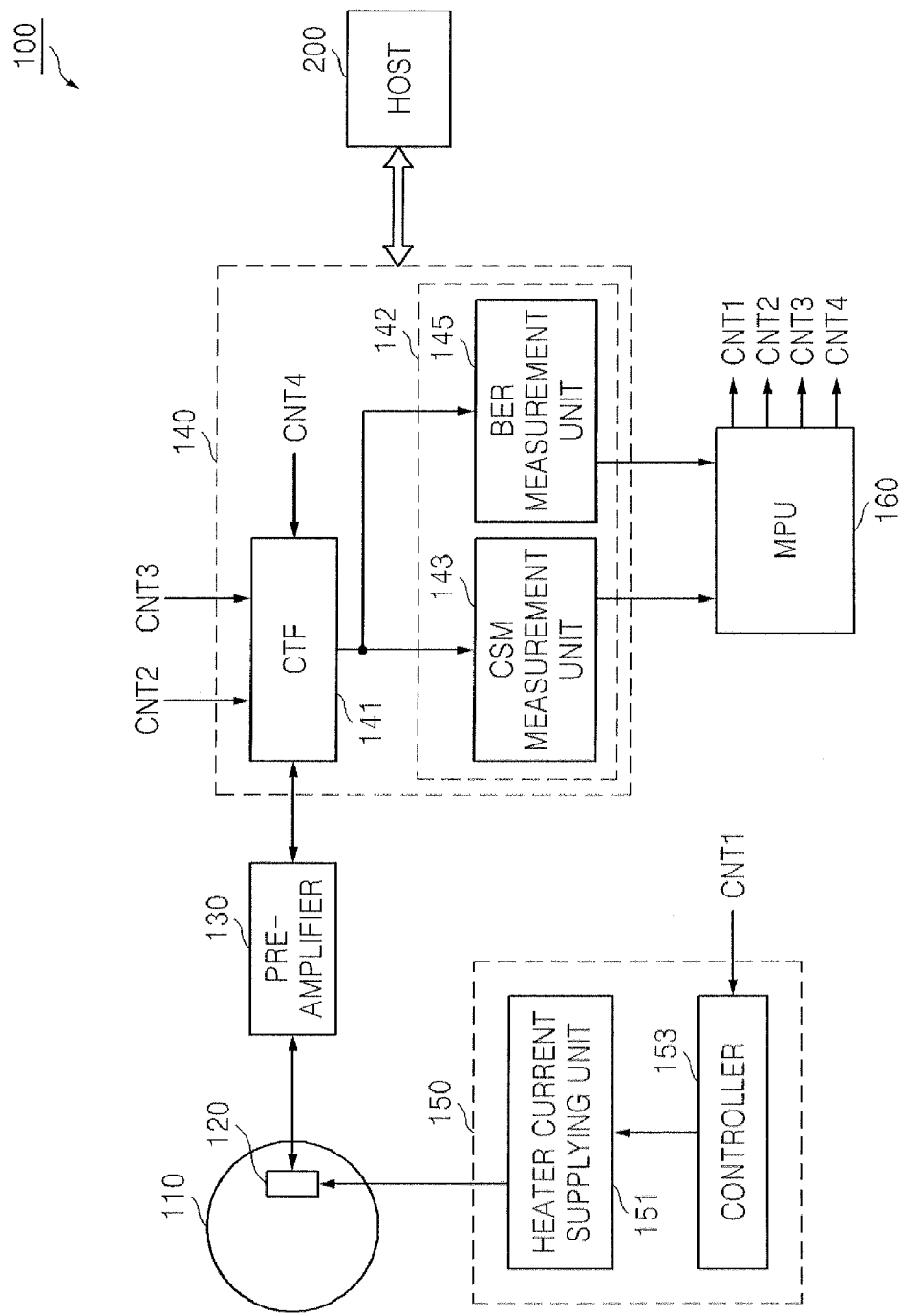
FIG. 1 illustrates a block diagram of a data storage device according to example embodiments of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram of a data storage device according to example embodiments of the present general inventive concept. The data storage device of the exemplary embodiment of the present general inventive concept can be, for example, a hard disk drive (HDD), however, it is not restricted thereto.

Referring to FIG. 1, the data storage device 100 may include a storage medium including at least one magnetic disk 110, a magnetic head 120, a magnetic head control unit 150, a pre-amplifier 130, a R/W (read/write) channel circuit 140, and a microprocessor unit (MPU) 160.

The storage medium may include at least a magnetic disk 110. A plurality of tracks formed in a concentric circle may be formed in the magnetic disk 110, and the plurality of tracks may include a plurality of sectors, respectively. The plurality of sectors may include a data field and a servo field, respectively, and a signal such as a preamble, a servo address, a gray code and so on may be recorded in the servo field. At least one magnetic disk 110 may be rotated by a spindle motor (not illustrated) and may store data. The magnetic head 120 may be arranged at least at every magnetic disk 110 and located at a top or a lower part of the surface of the magnetic disk 110. The magnetic head 120 may further include a converter (not illustrated), and the converter may perform a read operation and/or a write operation on the magnetic disk 110.

The magnetic head 120, which can include the converter, may perform a write operation by magnetizing the magnetic disk or perform a read operation by sensing a magnetic field of the magnetic disk 110 when located at predetermined height, e.g., flying height, from a surface of the spinning magnetic disk 110. The magnetic head 120 may further include a predetermined element, e.g., a heater (not illustrated), to control a flying height. The heater may form an air bearing layer between the magnetic head 120 and the magnetic disk 110. The heater may be manufactured with a coil to control a flying height of the magnetic head as a current level or amount supplied on the coil is controlled according to a heater current supplied from the magnetic head control unit 150. For example, as an amount of current supplied to a heating coil of the magnetic head 120 supplied from the magnetic head control unit 150 is large (e.g., greater than or equal to a predetermined current level), a flying height of the magnetic head 120 may approach the surface of the magnetic disk 110.

The magnetic head control unit 150, according to a first control signal CNT1 output from a MPU 160, may control a flying height of the magnetic head 120 when controlling a level or an amount of a heater current output to a heating coil of the magnetic head 120. The magnetic head control unit 150 may include a heater current supplying unit 151 and a controller 153. The heater current supplying unit 151 may supply a heater current to a heating coil of the magnetic head 120 according to a control of the controller 153. The controller 153 may control a level or an amount of a heater current output from the heater current supplying unit 151 according to a control signal, e.g., a first control signal CNT1, supplied from outside, e.g., the MPU 160.

In exemplary embodiments of the present general inventive concept as described herein the independent magnetic head control unit 150 is explained, however, it is not restricted thereto. For example, the magnetic head control unit 150 may be located inside of the magnetic head 120 or the pre-amplifier 130. The magnetic head control unit 150 may include the heater current supplying unit 151. The heater current supplying unit 151 may control a level and/or an amount of an output current in response to a first control signal CNT1 output from the MPU 160.

The pre-amp 130 may amplify a read signal output from the magnetic head 120 and/or output a write signal supplied through a R/W channel circuit 140 from outside, e.g., a host 200, to the magnetic head 120. For example, the pre-amp 130 may receive and amplify a read signal which the magnetic head 120 picked up from the magnetic disk 110, e.g., an analog read signal, during a read operation of a data storage device 100 and output an amplified read signal to the R/W channel circuit 140.

The pre-amp 130, during a write operation of the data storage device 100, may output a write signal supplied from the host 200, e.g., a write signal supplied through the R/W channel circuit 140 from the host 200, to the magnetic head 120 and control the write signal to be recorded on a magnetic disk 110 through the magnetic head 120.

The R/W channel circuit 140 may detect data pulse from a read signal output from the pre-amp 130 and supply it to the host 200 through a host interface (not illustrated) by decoding it. Additionally, the R/W channel circuit 140 may encode a write signal supplied from the host 200 through a host interface and supply an encoded write signal to the pre-amp 130. On the other hand, the R/W channel circuit 140, during a read operation of the data storage device 100, may test a read operation performance of the data storage device by using a read signal supplied from the magnetic head 120. Accordingly, the R/W channel circuit 140 may include a continuous time filter (CTF) 141 and measurement units 143 and 145.

The R/W channel circuit 140 may perform a read operation test of the data storage device 100 when the flying height of the magnetic head 120 is varied according to an external environment (e.g., an impact from outside, an operation temperature or a humidity), and may include an optimized CTF 141 to control a filter coefficient value of an internal CTF 141 according to a result of a read operation test.

The CTF 141 may filter a read signal according to at least one cut-off frequency, e.g., a first cut-off frequency and a second cut-off frequency, and output a read signal having a frequency bandwidth (e.g., a predetermined frequency bandwidth, a desired frequency bandwidth, etc.). For example, the first cut-off frequency of the CTF 141 may be a cutoff frequency to control a cut-off of a read signal, and the second cut-off frequency may be a boost frequency to control boosting of a read signal. The boost frequency may, at least in part, boost a filtering level of the CTF 141 to improve cut-off performance of the CTF 141.

The measurement unit 142 may measure a channel state and a bit error ratio from a read signal, e.g., a filtered read signal, output from the CTF 141. According to a measurement result of the measurement unit 142, the MPU 160 may output a control signal to control a filter coefficient value of the CTF 141. The measurement unit 142 may include a channel statistics measurement (CSM) unit 143 and a bit error ratio (BER) measurement unit 145. The CSM measurement unit 143 may measure a channel state from a filtered read signal output from the CTF 141 and output a CSM value according to a measurement result. The CTF 141 may change cutoff frequencies, e.g., a first cutoff frequency and a second cutoff frequency, according to a control signal, e.g., a second control signal CNT2, supplied from the MPU 160. The CSM measurement unit 143 may measure a channel state from a filtered read signal output from the CTF 141 according to a variable first cutoff frequency and/or a second cutoff frequency, and output a plurality of CSM values corresponding to at least one of or each of a plurality of variable cutoff frequencies to the MPU 160.

The BER measurement unit 145 may measure a bit error ratio from a filtered read signal corresponding to at least one CSM value among a plurality of CSM values output from the CSM measurement unit 143, and output a bit error ratio according to a measurement result to the MPU 160. For example, the BER measurement unit 145 may measure a bit error ratio on each of the read signals output from the CTF 141 by each of cutoff frequencies of the CTF 141 corresponding to each of a plurality of CSM values except for a CSM value having the maximum value output from a CSM measurement unit 143. Here, the CTF 141 may be varied successively by each of cutoff frequencies corresponding to each of CSM values except for a CSM value having the maximum value by a third control signal CNT3 supplied from the MPU 160. The BER measurement unit 145 may, for example, measure a bit error ratio of one or more of the read signals output from the CTF 141 by one or more predetermined cutoff frequencies of the CTF 141 corresponding to one or more CSM values.

The BER measurement unit 145 may output a plurality of bit error ratio values output according to a measurement result to the MPU 160. The MPU 160 may select a bit error ratio value (e.g., a bit error ratio value having a minimum value among a plurality of bit error ratio values, a bit error ratio value having a maximum value among the plurality of bit error ratio value, a bit error ratio that is greater than or equal to a predetermined threshold value, a bit error ratio that is less than or equal to a predetermined threshold value, etc.). The MPU 160 may sample (or extract) a cutoff frequency of the CTF 141 corresponding to a selected bit error ratio value and output a fourth control signal CNT4 to control a filter coefficient value of the CTF 141 so that the CTF 141 operates in a sampled (or extracted) cutoff frequency. Alternatively, the MPU 160 may select a predetermined cutoff frequency according to the selected bit error ratio value output a fourth control signal CNT4 to control a filter coefficient value of the CTF 141 so that the CTF 141 operates according to the selected predetermined cutoff frequency.

Accordingly, the CTF 141 may control a filter coefficient value by the fourth control signal CNT4 output from the MPU 160 and perform an optimal filtering.

The MPU 160 may output a plurality of control signals to control an operation of a data storage device 100. The plurality of control signals output from the MPU 160 may include a first control signal CNT1 output to a magnetic head control unit 150, a second control signal CNT2 output to the CTF 141, a third control signal CNT3 and a fourth control signal CNT4, respectively. The third control signal CNT3 may be generated according to a plurality of CSM values output from the CSM measurement unit 143, and the fourth control signal CNT4 may be generated according to a plurality of bit error ratio values output from the BER measurement unit 145.

A host 200 may transmit data to be written on the magnetic disk 110 to the R/W channel circuit 140 and/or receive a read data read by each component 120, 130 and 140 from the magnetic disk 110.

Figure 2:
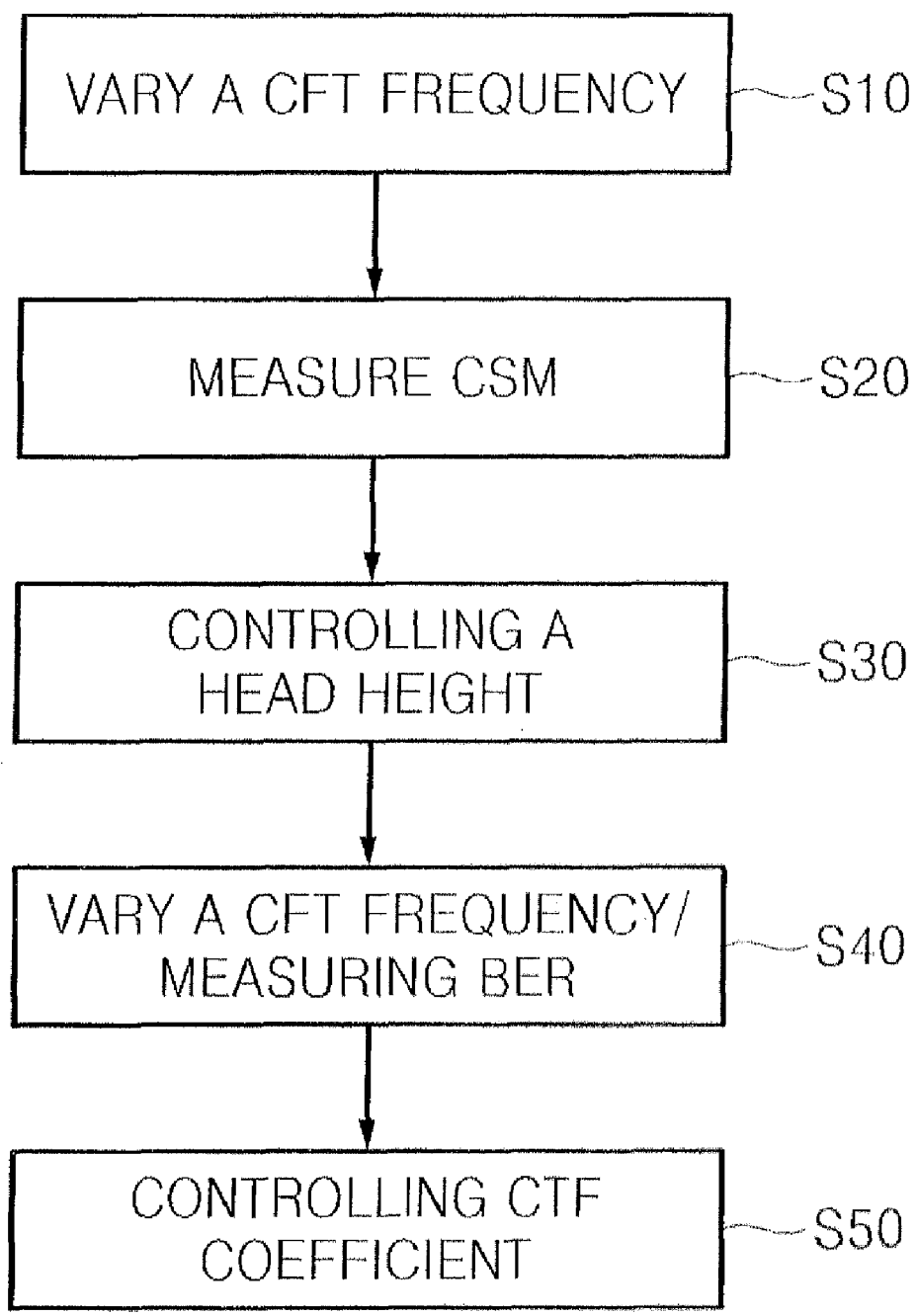
FIG. 2 is a flowchart illustrating a filter coefficient controlling operation of a continuous time filter of the data storage device of FIG. 1.

Described below is a CTF design method according to exemplary embodiments of the present general inventive concept of the data storage device described above, referring to FIGS. 2 to 4B in detail. FIG. 2 illustrates an operational flowchart according to an operation of controlling a filter coefficient of a continuous time filter design of the data storage device of FIG. 1, and FIGS. 3A to 4B illustrate exemplary embodiments according to a filter coefficient controlling operation of a continuous time filter of a data storage device of FIG. 2.

Referring to FIGS. 1 and 2, the magnetic head 120 may be positioned at a first flying height, e.g., a first reference height from surface of the magnetic disk 110, by a heater current output from the magnetic head control unit 150 according to a first control signal CNT1. Here, the first reference height may be, for example, about 3 nm. The first reference height may be any suitable positioning of the magnetic head 120 to carry out the exemplary embodiments of the present general inventive concept as described herein.

The MPU 160 output a second control signal CNT2 to the CTF 141 of the R/W channel circuit 140 and the CTF 141 may vary a cutoff frequency by increasing or decreasing to a predetermined step at operation S10. The magnetic head 120 may read data from the magnetic disk 110 while flying at the first reference height and output a read signal to the R/W channel circuit 140 through a pre-amplifier 130. The CTF 141 may also output a filtered read signal corresponding to each frequency according to a variable cutoff frequency.

For example, FIG. 3A illustrates an example embodiment that the CTF 141 varies a cut-off frequency FC successively according to a second control signal CNT2 output from the MPU 160, and FIG. 4A illustrates an example embodiment that the CTF 141 varies a boost frequency FB successively according to a second control signal CNT2 output from the MPU 160.

Figure 3B:
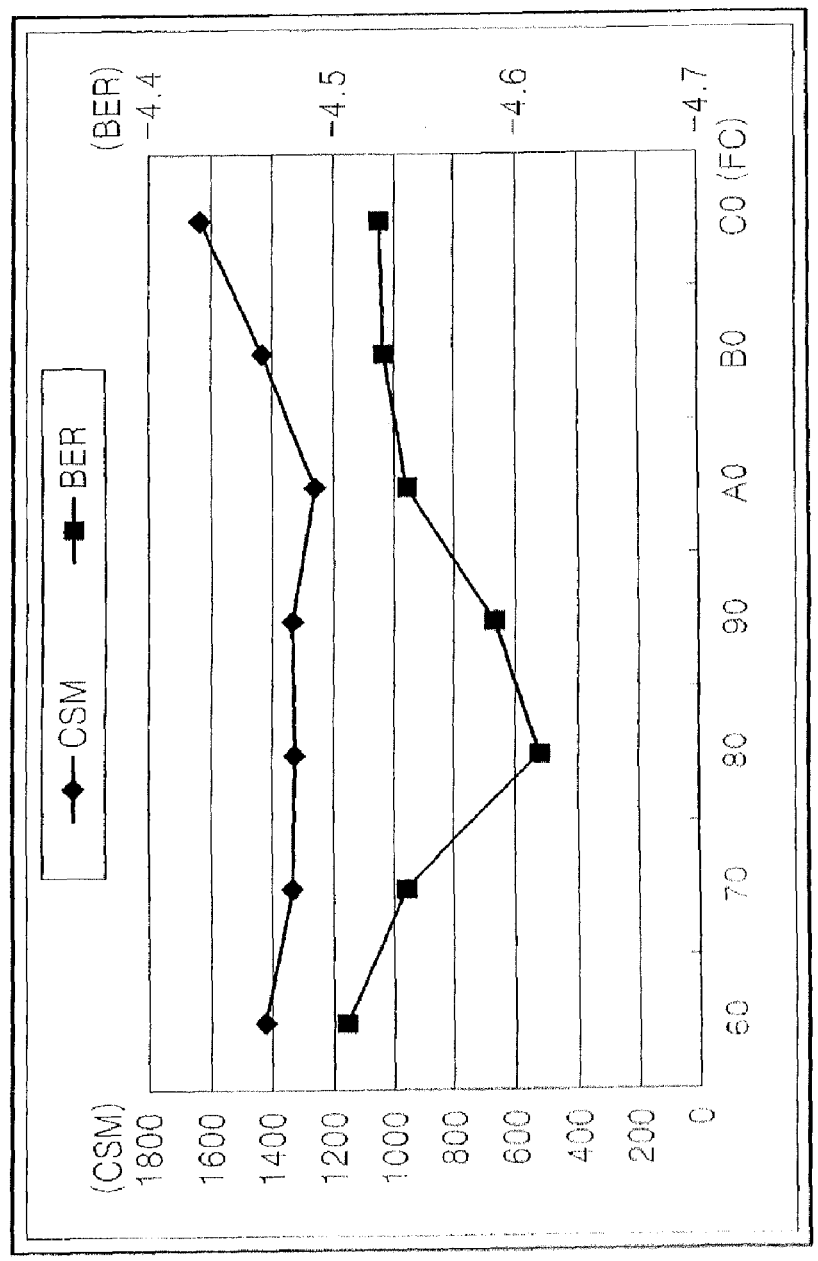

The CSM measurement unit 143 may measure a channel state on each of a plurality of filtered read signals which the CTF 141 outputs according to a varied cutoff frequency and output a plurality of CSM values according to a measurement result at operation S20. For example, referring to FIGS. 3A and 3B, the CSM measurement unit 143 may output a plurality of CSM values according to a plurality of varied cut-off frequencies FC. The MPU 160 may output remaining CSM values except for a maximum CSM value among a plurality of CSM values. For example, as illustrated in FIGS. 3A and 3B, the MPU 160 may sample (or extract) CSM values except for a maximum CSM value of 1639 measured when a cut-off frequency FC is C0.

Figure 4B:
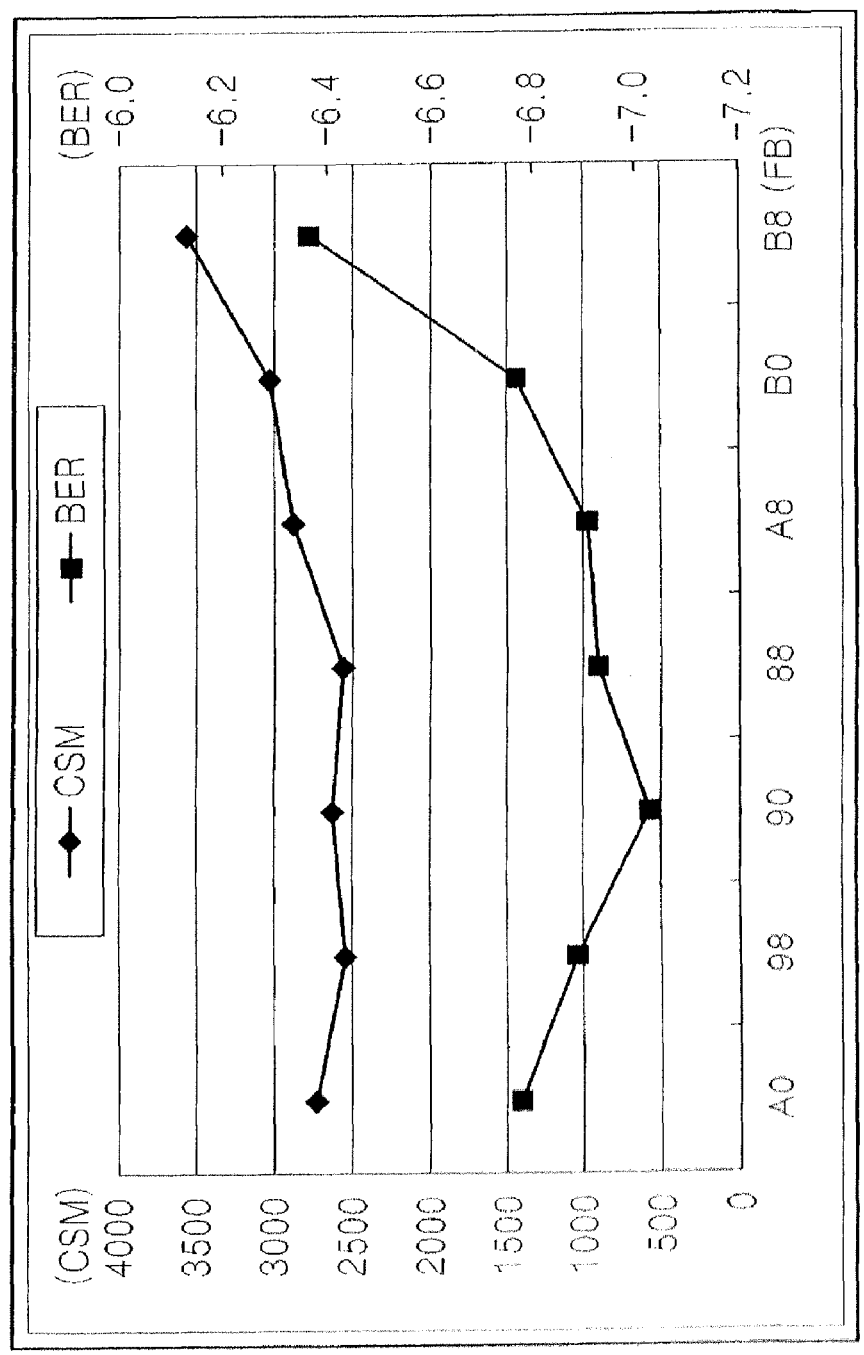

Referring to FIGS. 4A and 4B, the CSM measurement unit 143 may output a plurality of CSM values according to a plurality of varied boost frequencies FB. The MPU 160 may sample a plurality of CSM values except for a maximum CSM value. For example, as illustrated in FIGS. 4A and 4B, the MPU 160 may sample CSM values except for a maximum CSM value of 3572 measured when a boost frequency FB is B8. When the CSM values are sampled, the MPU 160 may control flying height of the magnetic head 120 by controlling a first control signal CNT1 output to the magnetic head control unit 150 at operation S30. For example, a controlled first control signal CNT1 output from the MPU 160 may adjust a level and/or an amount of heater current output from a heater current supplying unit 151 of the magnetic head control unit 150, and accordingly, the flying height of the magnetic head 120 may be controlled.

In example embodiments of the present general inventive concept, a level and/or an amount of a heater current output from the current supplying unit 151 may be decreased by a controlled first control signal CNT1 and the magnetic head 120 may be adjusted to a second reference height higher than a first reference height, accordingly. However, the present general inventive concept is not restricted thereto and a flying height of the magnetic head 120 may be adjusted by ±d, where d is a absolute value calculated after subtracting a first reference height from a second reference height, e.g., ±5 nm, in a normal direction perpendicular from a first reference height according to a level and/or an amount of heater current output from the heater current supplying unit 151.

When a flying height of the magnetic head 120 is adjusted to the second reference height, the MPU 160 may vary a cutoff frequency of the CTF 141 by outputting a third control signal CNT3 to the CTF 141 and measure a bit error ratio on each read signal output by each of varied cut-off frequencies of the CTF 141 at operation S40. For example, the MPU 160 may sample a frequency corresponding to each of CSM values sampled to vary a cut-off frequency of the CTF 141, e.g., CSM values except for a maximum CSM value, and vary a cutoff frequency of the CTF 141 according to sampled frequencies. That is, the MPU 160 may sample frequencies except for a frequency, e.g., a cut-off frequency FC of C0 illustrated in FIG. 3A and a boost frequency FB of B8 illustrated in FIG. 4A, corresponding to a maximum CSM value among a plurality of sampled CSM values. The MPU 160 may vary a cutoff frequency of the CTF 141 according to a plurality of sampled frequencies.

The BER measurement unit 145 may measure a bit error ratio from a plurality of filtered read signals output from the CTF 141 according to each varied cutoff frequency and output a measurement result value, e.g., a plurality of bit error ratio values. The plurality of bit error ratio values may be output to the MPU 160.

The MPU 160 may select one of a plurality of bit error ratio values, e.g., a minimum bit error ratio value, and sample a cutoff frequency of the CTF corresponding to a selected minimum bit error ratio value. The MPU 160 may output a control signal to make the CTF 141 operate in a sampled cutoff frequency, e.g., a fourth control signal CNT4 capable of controlling a filter coefficient value of the CTF 141. The CTF 141 may control a filter coefficient value according to the fourth control signal CNT4 at operation S50.

Referring to FIGS. 1, 3A and 3B, the BER measurement unit 145 may measure a bit error ratio from a filtered read signal output from the CTF 141 at every varied cut-off frequency FC. The MPU 160 may select a minimum BER value, e.g., a BER value of −4.61 measured when a cutoff frequency FC is 80, among a plurality of measured BER values. The MPU 160 may sample a cut-off frequency FC of 80 corresponding to a selected BER value of −4.61 and output a fourth control signal CNT4 so that the CTF 141 may operate in a cut-off frequency FC of 80. The CTF 141 may control a filter coefficient value so that a cut-off frequency FC becomes 80 according to the fourth control signal CNT4.

Referring to FIGS. 1, 4A and 4B, the BER measurement unit 145 may measure a bit error ratio from a filtered read signal output from the CTF 141 at every varied boost frequency FB. The MPU 160 may select a minimum BER value, e.g., a BER value of −7.03 measured when the boost frequency FB is 90, among a plurality of measured BER values.

The MPU 160 may sample a boost frequency FC of 90 corresponding to a selected BER value of −7.03 and output a fourth control signal CNT4 so that the CTF 141 may operate in a boost frequency FB of 90. The CTF 141 may control a filter coefficient value so that the boost frequency FB becomes 90 according to the fourth control signal CNT4.

That is, a data storage device 100 according to the example embodiments of the present general inventive concept may control a flying height of the magnetic head 120 not to be an optimal height artificially, selecting an optimal filter coefficient of the CTF 141 by measuring reading operation performance of the magnetic head 120 and controlling the CTF 141 in a optimal filtering operation state. Accordingly, although a flying height of the magnetic head 120 can be varied according to a use environment of the data storage device 100, the data storage device 100 may perform an optimal CTF 141 filtering operation and a read operation of the data storage device 100.

The example embodiments of the present general inventive concept explain a method of drawing an optimal CTF 141 filter coefficient while the data storage device 100 performs a read operation. However, the present general inventive concept is not restricted thereto and it may be used in a method of drawing an optimal CTF 141 filter coefficient when the data storage device 100 performs a write operation.

A method of controlling a filter coefficient of a continuous time filter of a data storage device according to the present general inventive concept and a data storage device thereof may provide a reliable data storage device by drawing an optimal CTF filter coefficient considering a flying height of a magnetic head, which may be varied according to a use environment.

Although several embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A method of controlling a filter coefficient of a continuous time filter of a data storage device, the method comprising:

positioning a magnetic head at a first reference height from a surface of a magnetic disk and outputting a plurality of Channel Statistics Measurement (CSM) values by measuring a channel state from a read signal output from the magnetic head when varying a cut-off frequency of a continuous time filter (CTF);

positioning the magnetic head at a second reference height spaced from the first reference height and measuring a bit error ratio (BER) from the read signal output from the magnetic head positioned at the second reference height according to at least one CSM value selected among the plurality of CSM values; and controlling a filter coefficient value to determine the cut-off frequency of the continuous time filter according to the measured bit error ratio.

2. The method of claim 1, wherein the measuring the bit error ratio comprises:

sampling CSM values except for a maximum CSM value among the plurality of CSM values;

positioning the magnetic head at the second reference height; and measuring the bit error ratio from the read signal according to the sampled CSM values.

3. The method of claim 2, wherein the measuring the bit error ratio further comprises:
varying each of the cut-off frequencies of the continuous time filter corresponding to each of the sampled CSM values.

4. The method of claim 1, wherein the outputting the plurality of CSM values comprises:
measuring the channel state from the read signal according to the cut-off frequency, and outputting the plurality of CSM values according to a measurement result when varying a cut-off frequency of the continuous time filter successively.

5. The method of claim 1, wherein the outputting the plurality of CSM values comprises:
measuring the channel state from the read signal according to the boost frequency and outputting the plurality of CSM values according to a measurement result when changing a boost frequency of the continuous time filter successively.

6. The method of claim 1, wherein the controlling a filter coefficient value to determine the cut-off frequency controls the filter coefficient value according to the cut-off frequency of the continuous time filter corresponding to a bit error ratio having a minimum value among at least a measured bit error ratio.

7. The method of claim 1, wherein the magnetic head is controlled to be positioned at the second reference height separated in a normal direction from the first reference height.

8. A data storage device, comprising:
a magnetic disk to store data;
a magnetic head separated by a flying height from a surface of the magnetic disk and to output a read signal by decoding the data of the magnetic disk;
a continuous time filter (CTF) to filter and output the read signal at every variable cut-off frequency;
a measurement unit to measure a channel state and a bit error ratio from the filtered read signal and to output a measurement result; and
a microprocessor unit to control a filter coefficient value of the continuous time filter according to the measurement result output from the measurement unit when changing a cut-off frequency of the continuous time filter.

9. The data storage device of claim 8, wherein the measurement unit comprises:
a CSM measurement unit to measure a channel state from the filtered read signal and to output a plurality of channel statistics measurement (CSM) values; and
a BER measurement unit to measure a bit error ratio (BER) from the filtered read signal corresponding to at least one CSM value among the plurality of CSM values and to output at least one bit error ratio value,
wherein the micro-processor samples a cut-off frequency of the continuous time filter corresponding to a minimum bit error ratio value among the at least one bit error ratio value and controls the filter coefficient value according to the sampled cut-off frequency.

10. The data storage device of claim 9, further comprising:
a magnetic head control unit,
wherein the magnetic head control unit controls the flying height of the magnetic head to a normal direction when the CSM measurement unit outputs the plurality of CSM values.

11. The data storage device of claim 8, wherein the data storage device is a hard disk drive (HDD).

12. A data storage apparatus, comprising:
a data storage unit to store data;
a continuous time filter to vary a cutoff frequency and to output at least one read signal by decoding data from the data storage unit;
a measurement apparatus to measure a channel state and a bit error of at least one filtered read signal according to the varied cutoff frequency and to output a measurement result; and
a controller to control a filter coefficient value of the continuous time filter according to the measurement result.

* * * * *